US011902128B2

(12) United States Patent
Cakulev et al.

(10) Patent No.: US 11,902,128 B2
(45) Date of Patent: Feb. 13, 2024

(54) SYSTEMS AND METHODS FOR CLOSED LOOP QOS MANAGEMENT

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Yousef Abdelmalek, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/696,944

(22) Filed: Mar. 17, 2022

(65) Prior Publication Data
US 2023/0300049 A1  Sep. 21, 2023

(51) Int. Cl.
*H04L 43/0817* (2022.01)
*H04L 45/00* (2022.01)
*H04L 45/302* (2022.01)
*H04L 43/062* (2022.01)

(52) U.S. Cl.
CPC ........ *H04L 43/0817* (2013.01); *H04L 43/062* (2013.01); *H04L 45/302* (2013.01); *H04L 45/38* (2013.01)

(58) Field of Classification Search
None
See application file for complete search history.

(56) References Cited

U.S. PATENT DOCUMENTS

| 2014/0140213 | A1* | 5/2014 | Raleigh | H04L 41/0893 |
| | | | | 370/235 |
| 2017/0317894 | A1* | 11/2017 | Dao | H04L 41/5009 |
| 2017/0366993 | A1* | 12/2017 | Bejerano | H04L 1/003 |
| 2020/0389809 | A1* | 12/2020 | Jiang | H04L 5/0053 |
| 2022/0038943 | A1* | 2/2022 | Hu | H04W 28/0268 |

* cited by examiner

*Primary Examiner* — Anh Nguyen

(57) ABSTRACT

Systems and methods described herein allow mobile network operators to provide an adaptive quality of service (QoS) approach for application providers. A network device in a core network receives a QoS monitoring report based on QoS monitoring by an access station. The QoS monitoring report includes data for QoS parameters for network services in a default QoS flow supporting a protocol data unit (PDU) session. Based on the QoS monitoring report, the network device determines if the default QoS flow supports a required service level for the PDU session. When the network device determines that the default QoS flow does not support the required service level for the PDU session, the network device automatically activates a dedicated QoS flow to support the PDU session with the required service level.

20 Claims, 8 Drawing Sheets

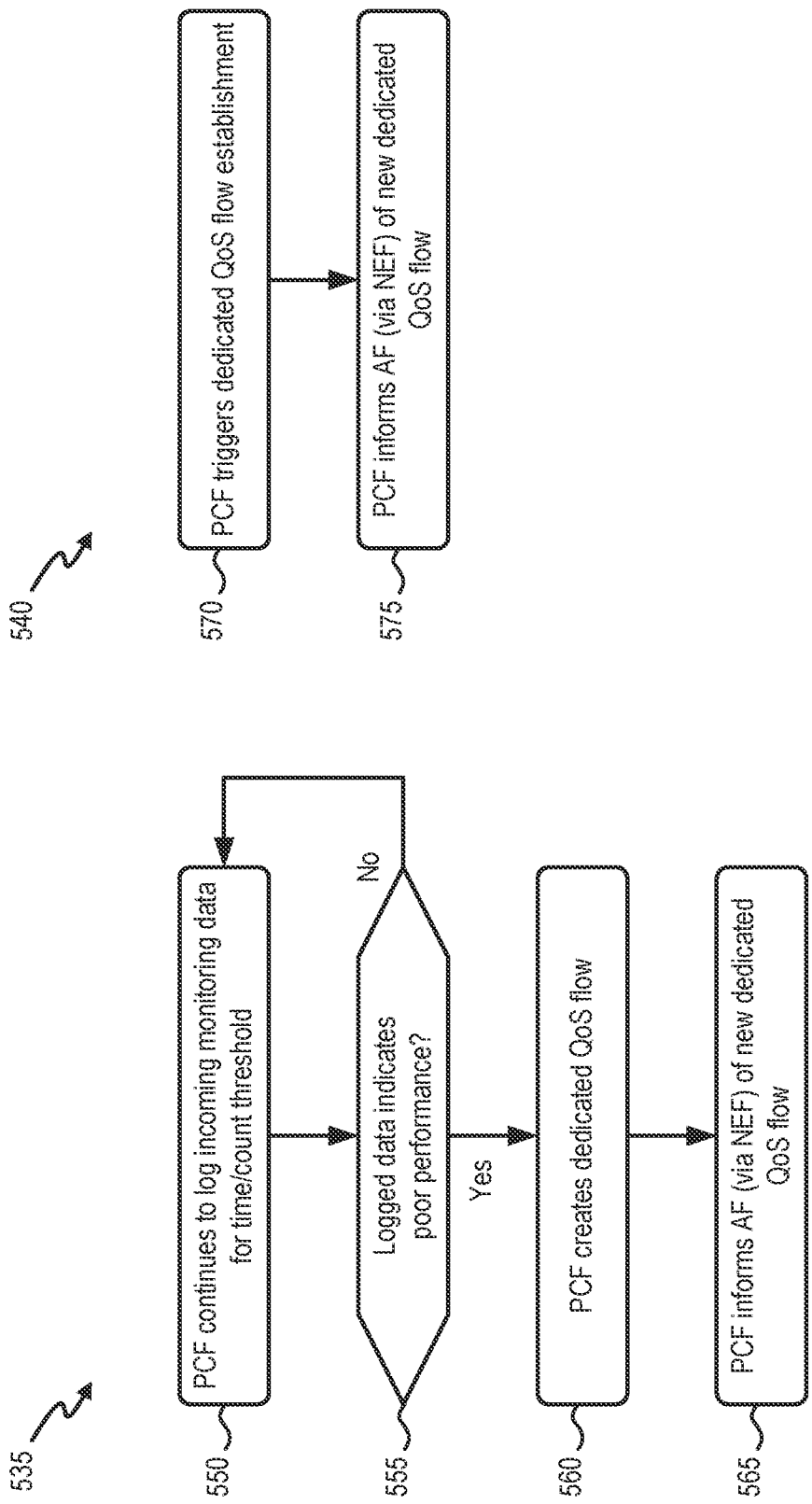

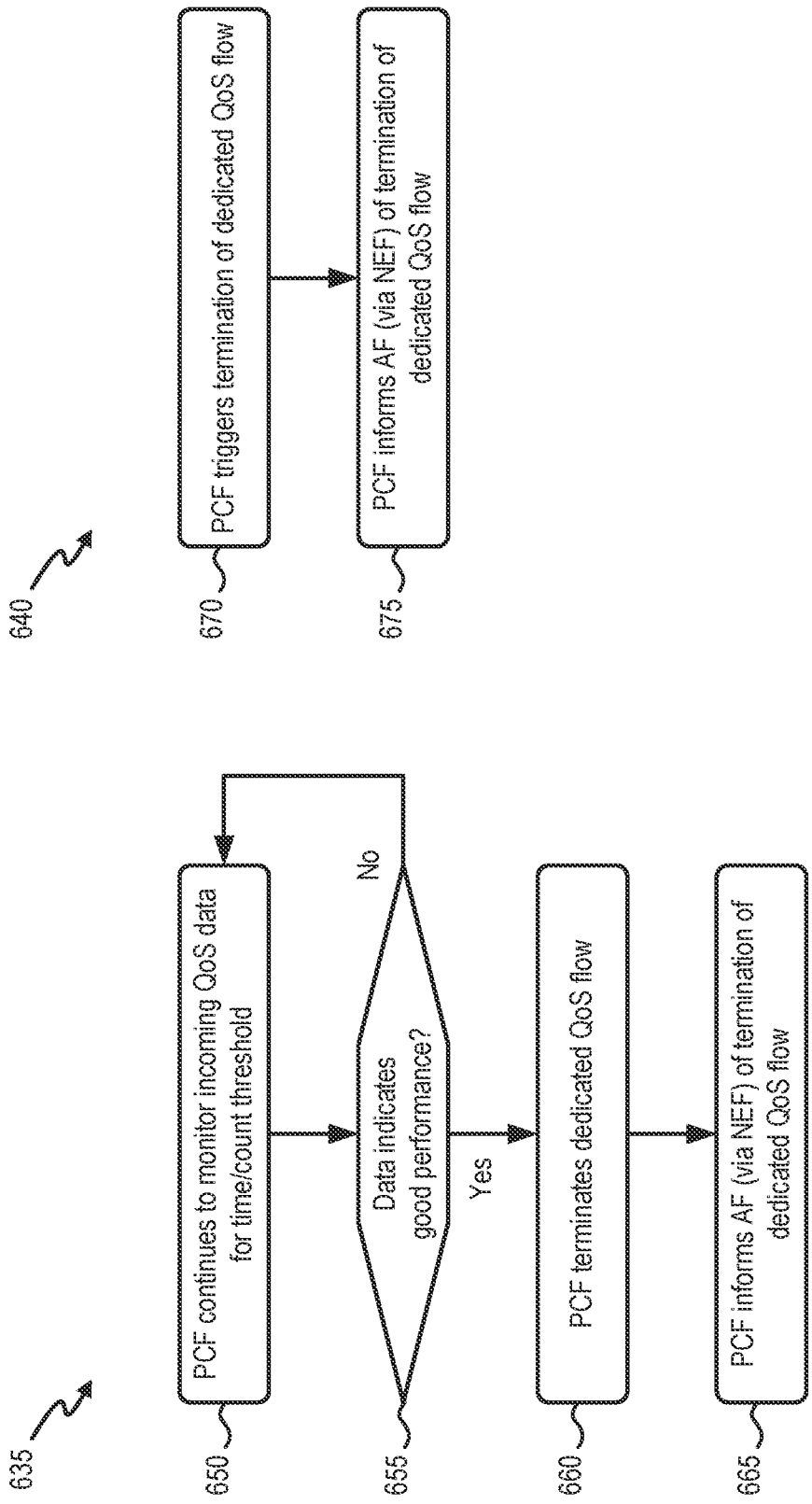

SYSTEMS AND METHODS FOR CLOSED LOOP QOS MANAGEMENT

BACKGROUND

Fifth Generation (5G) networks may include a core network that supports and manages 5G radio access networks (RANs), providing various services and enabling connections to other networks (e.g., connections to the Internet, etc.). Different types of services in 5G networks may be implemented using network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources and may be configured to implement different quality of service (QoS) requirements.

BRIEF DESCRIPTION OF THE DRAWINGS

FIGS. 5A-5C are flow diagrams illustrating an exemplary process for upgrading to a dedicated QoS flow in a closed loop QoS management service; and FIGS. 6A-6C are flow diagrams illustrating an exemplary process for downgrading to a default QoS flow in a closed loop QoS management service.

DETAILED DESCRIPTION OF THE PREFERRED EMBODIMENTS

Figure 1:
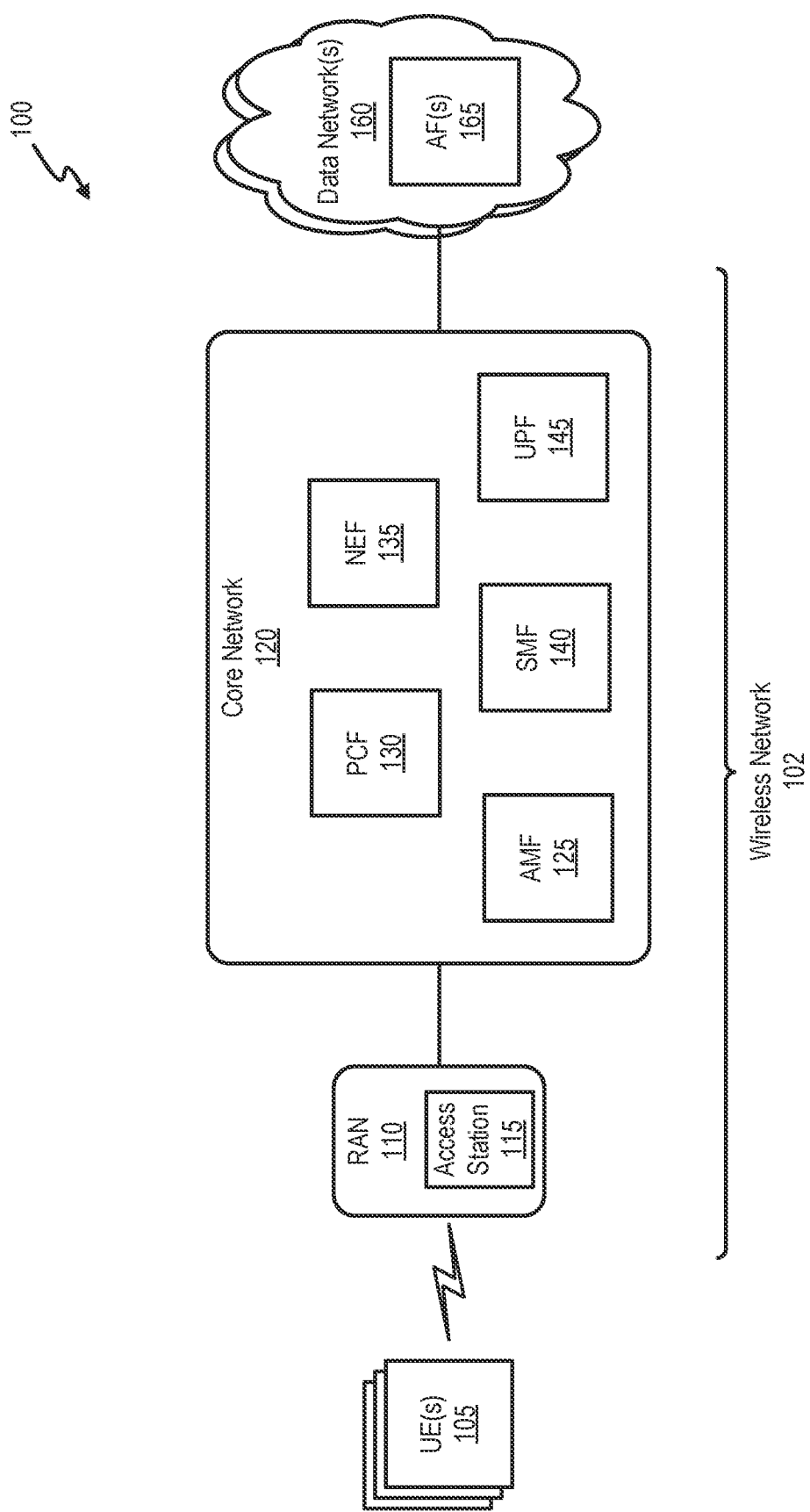
FIG. 1 is a diagram that depicts an exemplary network environment in which systems and methods described herein may be implemented.

The following detailed description refers to the accompanying drawings. The same reference numbers in different drawings may identify the same or similar elements.

When a network slice is supported end-to-end by a 5G network, a network slice may be dedicated to serve a single application function (AF) to provide a desired quality of service (QoS). Low latency applications, such as mobile gaming applications, may require special treatment via QoS flows, such as a default 5G QoS Identifier (5QI) on an internet access point name (APN) or a customized APN.

Creating a dedicated static QoS flow over a network slice is not efficient from a RAN and core network resources perspective, because network resources have to be reserved even if the user is not using the related QoS flow application. Conversely, creating a dedicated dynamic QoS flow may also not be efficient from a RAN and core resources perspective, because when the network is not congested, it is still possible to carry the traffic on a default QoS flow. Thus, from a resource use perspective, it is preferable to use a default QoS flow whenever possible and use dedicated QoS flows only when the default QoS cannot support required service levels for an AF. However, an efficient adaptive QoS approach is not supported in current 5G networks.

Current 3GPP QoS monitoring provides an open loop structure. An AF may request QoS monitoring via a Network Exposure Function (NEF) in the 5G core network. The NEF may propagate the monitoring request to other network functions (NFs), including a policy control function (PCF) and user plane function (UPF) for the AF. The UPF may trigger a QoS monitoring report when certain conditions are met (e.g., indicating a missed QoS level requirement). However, no dynamic actions to resolve unmet QoS standards (e.g., a closed-loop mechanism) are taken within the network.

Systems and methods described herein provide closed loop QoS management using QoS monitoring reports and improved PCF logic. According to an implementation, a network device in a core network (e.g., a PCF) may receive a QoS monitoring report based on QoS monitoring by an access station (e.g., a gNodeB). The QoS monitoring report may include data for QoS parameters for network services in a default QoS flow supporting a protocol data unit (PDU) session. Based on the QoS monitoring report, the network device may determine if the default QoS flow supports a required service level for the PDU session. When the network device determines that the default QoS flow does not support the required service level for the PDU session, the network device may automatically activate a dedicated QoS flow on an existing slice or a dedicated network slice to support the PDU session with the required service level.

Implementations described herein allow mobile network operators to provide an adaptive QoS approach for application providers. Mobile network operators may apply a default QoS flow to service an application when network conditions permit the required service levels and use a dedicated QoS flow only when the default QoS flow cannot support the required service levels for the AF.

FIG. 1 is a diagram that depicts an exemplary network environment 100 in which systems and methods described herein may be implemented. As shown in FIG. 1, network environment 100 may include a wireless network 102 with a radio access network (RAN) 110 and a core network 120; groups of user equipment (UE) devices 105 (referred to individually and generically as UE 105); and one or more data networks 160 that include one or more Application Functions (AFs) 165.

In one implementation, wireless network 102 may be a 5G network, but could be any advanced wireless network that implements network slicing and may include one or more devices that are physical and/or logical entities interconnected via standardized interfaces. Wireless network 102 provides wireless services and wireless IP connectivity to user devices (such as UEs 105) to provide, for example, data, voice, and/or multimedia services. RAN 110 may include one or more radio access stations (e.g., a 5G gNB, etc.) connected to devices in core network 120.

RAN 110 may allow UE 105 to access core network 120. To do so, RAN 110 may establish and maintain, with participation from UE 105, an over-the-air channel with UE 105; and maintain backhaul channels with core network 120. RAN 110 may convey information through these channels, from UE 105 to core network 120 and vice versa. According to various embodiments, RAN 110 may be implemented according to various wireless technologies (e.g., radio access technology (RAT), etc.), wireless standards, wireless frequencies/bands, and so forth.

Depending on the implementation, RAN 110 may include one or multiple types of access stations 115. For example, access station 115 may include a next generation Node B (gNodeB or gNB) for a 5G NR RAN or another type of wireless node. According to an implementation, access station 115 may include a gNB with multiple distributed components, such as a central unit (CU), a distributed unit (DU), a remote unit (RU or a remote radio unit (RRU)), or another type of distributed component. In some implementations, RAN 110 may include Multi-Access Edge Computing (MEC) clusters, which may be located geographically close to access stations 115, and therefore also close to UEs 105 serviced by access station 115. Depending on the implementations, the MEC clusters may provide some core functions at network edges.

According to an implementation, access station 115 may receive instructions (e.g., via core network 120) to provide QoS monitoring for a particular PDU session or QoS flow. QoS monitoring may include, for example, monitoring parameters (e.g., delay, jitter, packet loss, signal strength, signal-to-noise ratio, etc.) for applications or other services provided by AF 165 that use data transmissions over wireless network 102. Depending on the instructions from core network 120, access station 115 may provide (e.g., to UPF 145) periodic monitoring results or triggered monitoring reports of QoS conditions. Data from the monitoring report can be compared to one or more thresholds of the policy for the service, and the results of the comparison can be used in bearer selection (e.g., default QoS flow or dedicated QoS flow) for UE 105 for the particular service.

Core network 120 (also referred to herein as a "wireless core network") may include one or multiple networks of one or multiple types. According to an implementation, core network 120 may be a next generation core (NGC) network for a 5G system. According to different implementations, core network 120 may include, for example, standalone 5G core network components or core components that combine 5G and 4G functionality. Core network 120 may allow the delivery of Internet Protocol (IP) services to UE 105, and may interface with other networks, such as data network 160. As shown in FIG. 1, core network 120 includes an Access and Mobility Management Function (AMF) 125, PCF 130, a NEF 135, a Session Management Function (SMF) 140, and a User Plane Function (UPF) 145. Although core network 120 may include other 5G core network components, 4G core network components, or another type of core network components, they are not illustrated in FIG. 1 for simplicity. Other embodiments may include additional or different network entities in alternative configurations than those exemplified in FIG. 1.

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices that provide various applications, services, or other type of UE device assets (e.g., servers (e.g., web, application, cloud, etc.), mass storage devices, data center devices), and/or other types of network services pertaining to various network-related functions.

According to an implementation described herein, data network 160 may include one or more AFs 165 that provide application services to UEs 105. In some implementations, AFs 165 may include low latency applications, such as mobile gaming applications, that require special treatment via QoS flows. Mobile network 102 may associate each AF 165 with a network slice to service UEs 105. AF 165 may be accessible via an Naf interface, also referred to as an NG5 interface. AF 165 may send a request to provide a policy for a particular application to PCF 130 via NEF 135. For example, AF 165 may be configured to request, from core network 120, closed loop QoS management for a particular PDU session with UE 105.

UE 105 (also referred to as an "end device") may include a device that has computational and wireless communication capabilities to support network slicing. UE 105 may be implemented as a mobile device, a portable device, or a stationary device. UE 105 may be implemented as a user device, a Machine Type Communication (MTC) device, an Internet of Things (IoT) device, an enhanced MTC device (eMTC) (also known as Cat-M1), a NB-IoT device, a machine-to-machine (M2M) device, or some other type of wireless end node. By way of further example, UE 105 may be implemented as a smartphone, a wearable device, a set top box, a telematics system in a vehicle, a smart television, a game system, or some other type of wireless user device. According to various exemplary embodiments, UE 105 may be configured to execute various types of software (e.g., applications, programs, etc.) in conjunction with services provided by an application server (e.g., AF 165). The number and the types of software may vary from one UE 105 to another UE 105. UE 105 may communicate with access stations 115 (e.g., a gNB) in RAN 110 via an N1 interface, for example.

AMF 125 may perform registration management, connection management, reachability management, mobility management, lawful intercepts, short message service (SMS) transport for UE 105, management of messages between UE 105 and an SMF (e.g., SMF 140), access authentication and authorization, and location services management. AMF 125 may provide the functionality to support non-3rd Generation Partnership Project (3GPP) access networks, and/or other types of processes. According to implementations described herein, AMF 125 may route instructions to access station 115 to initiate QoS monitoring for the closed loop QoS management service. AMF 232 may communicate with access stations 115 (e.g., a gNB) in RAN 110 via an N2 interface, for example.

PCF 130 may support policies to control network behavior, provide policy rules to control plane functions (e.g., to AMF 125, SMF 140, UPF 145, etc.), access subscription information relevant to policy decisions, make policy decisions, and/or perform other types of processes associated with policy enforcement. According to an implementation, PCF 130 may be provisioned with policy rules (per application) to adaptively activate/terminate a dedicated QoS flow for a PDU session in response to network conditions. PCF 130 may receive QoS monitoring reports (e.g., via UPF 145) based on QoS monitoring from access station 115 and determine when to initiate or terminate a dedicated QoS flow for a PDU session between UE device 105 and AF 165.

NEF 135 may expose capabilities and events to other NFs, including third party NFs, AFs, edge computing NFs, and/or other types of NFs. Furthermore, NEF 135 may secure provisioning of information from external applications to core network 120, translate information between core network 120 and devices/networks external to core network 120, support a Packet Flow Description (PFD) function, and/or perform other types of network exposure functions. According to implementations described herein, NEF 135 may receive a request from an AF 165 to control QoS for a PDU session with a UE device 105. NEF 135 may communicate an AF's QoS monitoring request to other NFs, including access station 115, AMF 125, PCF 130, SMF 140, and UPF 145. NEF 358 may be accessible via Nnef interface.

SMF 140 may perform session establishment, session modification, and/or session release, perform IP address allocation and management, perform Dynamic Host Configuration Protocol (DHCP) functions, perform selection and control of UPF 145, configure traffic steering at UPF 145 to guide the traffic to the correct destinations, perform lawful intercepts, charge data collection, support charging interfaces, control and coordinate of charging data collection, perform downlink data notification, manage roaming functionality, and/or perform other types of control plane processes for managing user plane data.

UPF 145 may maintain an anchor point for intra/inter-RAT mobility, maintain an external PDU point of interconnect to a particular data network (e.g., data network 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, and/or perform other types of user plane processes. According to an implementation, UPF 145 may receive QoS monitoring results from an access station 115 and forward QoS monitoring reports to other NFs in core network 120.

Devices, functions, and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Figure 2:
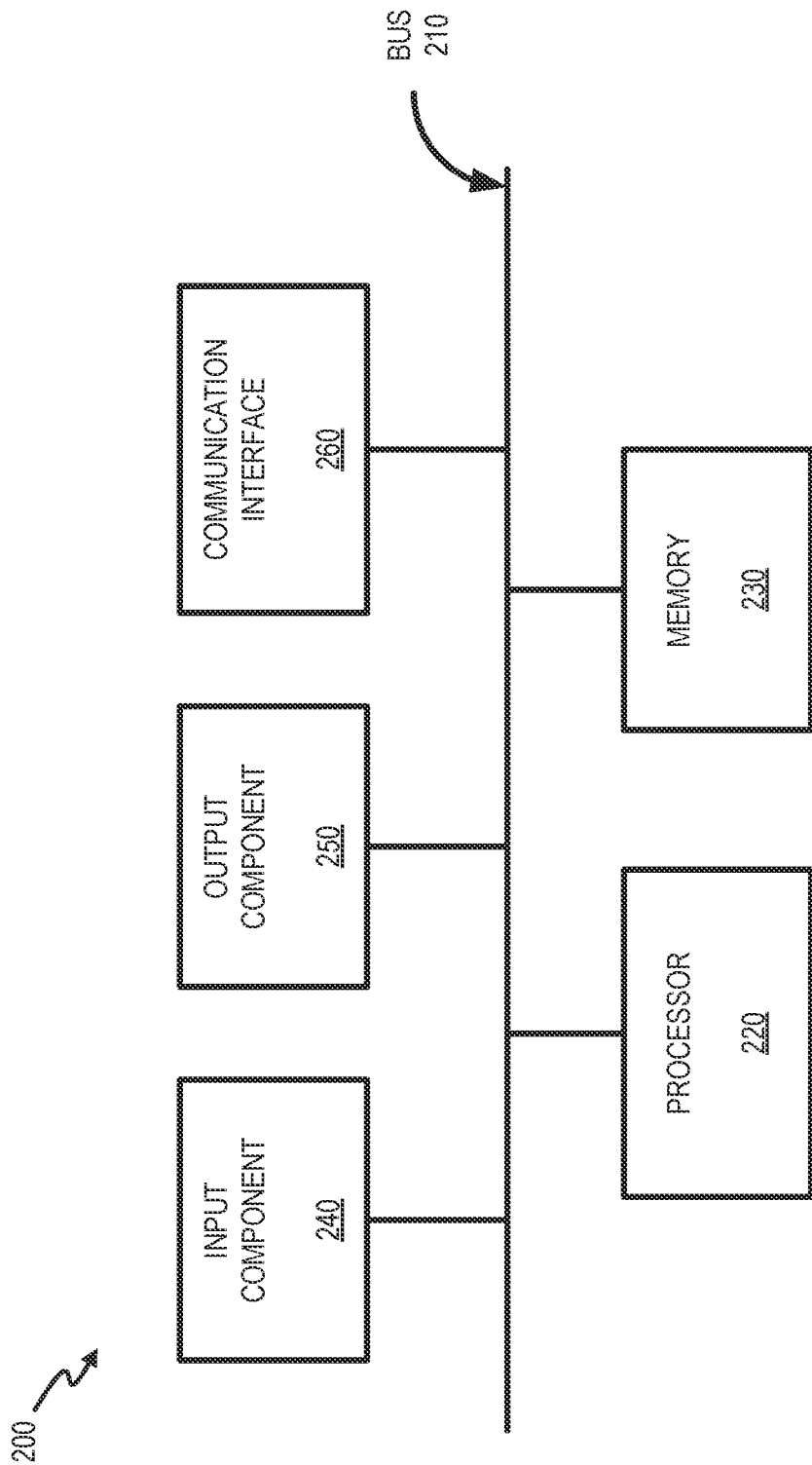
FIG. 2 shows a diagram of exemplary components that may be included in a network device that supports features described herein.

FIG. 2 is a diagram illustrating exemplary components of a device 200. Device 200 may correspond to or include, for example, UE 105, access station 115, AMF 125, PCF 130, NEF 135, SMF 140, UPF 145, AF 165, or another component of wireless network 102. Alternatively or additionally, access station 115, AMF 125, PCF 130, NEF 135, SMF 140, UPF 145, AF 165 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to UE 105/radio access station 115, and receive RF signals over the air from radio access station 115/UE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3:
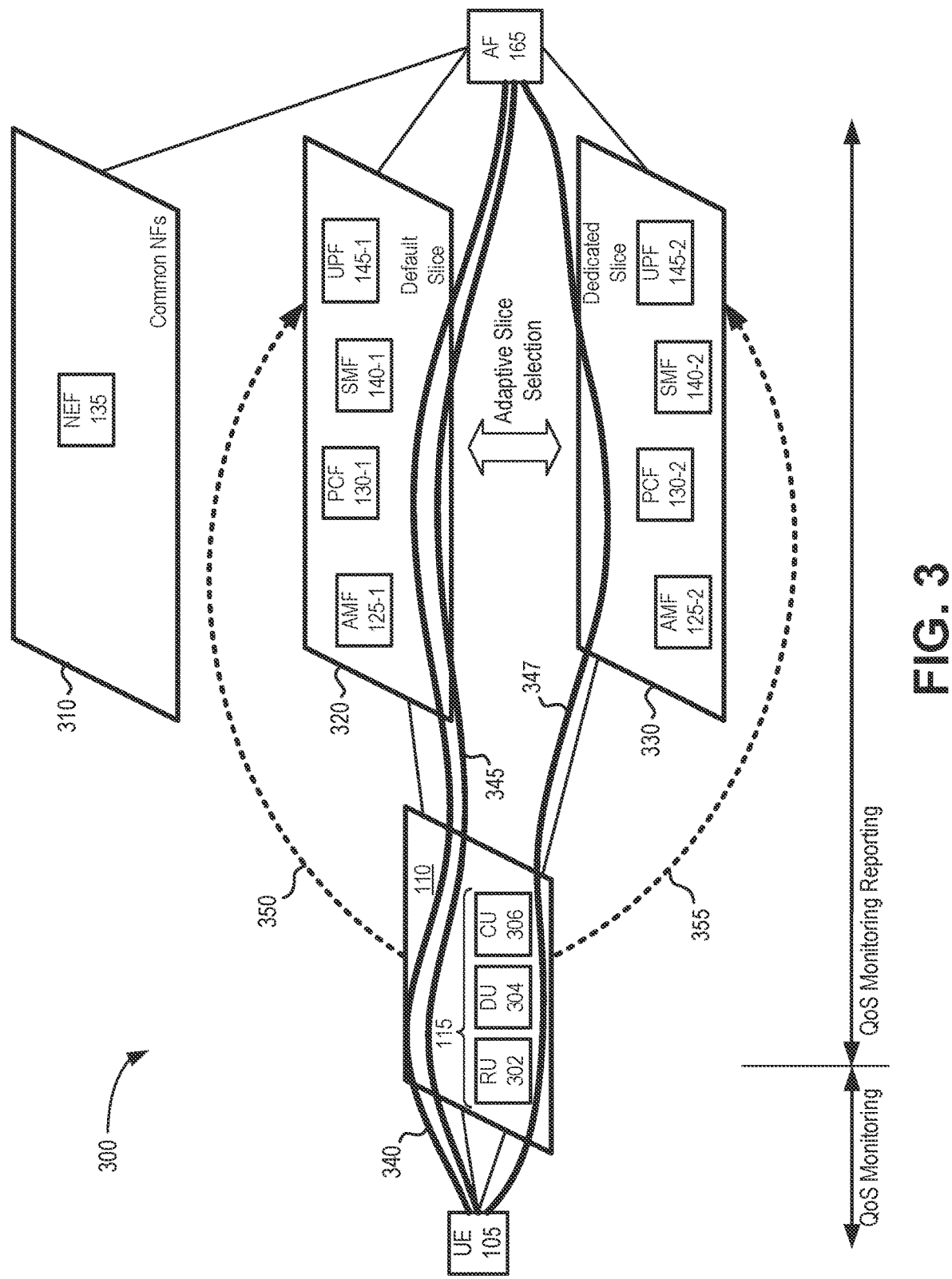
FIG. 3 is a block diagram illustrating concepts for a closed loop QoS management service described herein.

FIG. 3 is a simplified illustration of a network slicing configuration for a network environment 300 in which the systems and methods described herein may be implemented. In the example of FIG. 3, core network 120 may include a common set of NFs 305 for a PLMN and two network slices 320 and 330. A UE 105 may access each of network slices 320 and 330 via access station 115 of RAN 110. The access station 115 may include multiple distributed components, such as a central unit (CU) 302, a distributed unit (DU) 304, a remote unit (RU) 306. Each of network slices 320 and 330 may include one or more NFs or virtual NFs that provide the networking capabilities available to users (e.g., UE 105) of the network slice. Within the network slice, a UE 105 may have one or multiple QoS flows.

In the example of FIG. 3, the set of common NFs 310 may include an NEF 135. Although not illustrated, other network functions among common NFs 310 may include, a unified data management (UDM), a network repository function (NRF), a network slice selection function (NSSF), an authentication server function (AUSF), etc.

Network slice 320 may be a default slice designated for enhanced Mobile Broadband (eMBB) control plane (CP) communications and/or eMBB user plane (UP) communications. Network slice 320 may be configured to support QoS flows for different PDU sessions with multiple QoS levels. Network slice 320 may include, among other network functions, AMF 125-1, PCF 130-1, SMF 140-1, and UPF 145-1 associated with communications for AF 165.

Network slice 330 may be a dedicated slice with a high QoS level to support, for example, QoS flows for mobile gaming or other high-bandwidth and low-latency applications. Network slice 330 may include, among other network functions, AMF 125-2, PCF 130-2, SMF 140-2, and UPF 145-2 associated with communications for AF 165. In other implementations, some functions of network slices 320/330, such as an AMF 125 and/or PCF 130, may be combined as common NFs for network slices 320 and 330.

According to implementations described herein, UE 105 may establish a PDU session over a default network slice 320 with a default QoS flow (e.g., default QoS flow 340), and AF 165 may request adaptive closed loop QoS management service. To support the closed loop QoS management service, access station 115 may perform QoS monitoring for QoS flow 340 between UE 105 and access station 115 and provide QoS monitoring data 350 to NFs in core network 120. In one implementation, access station 115 may provide QoS monitoring data 350 to UPF 145-1 in a periodic manner, such as every few seconds. In another implementation, access station 115 may provide QoS monitoring data 350 to UPF 145-1 whenever a defined threshold (e.g., a QoS key performance indicator (KPI) level) for a particular service level is crossed. Access station 115 may communicate QoS monitoring data 350 to UPF 145-1 using an N3 interface. According to other embodiments, other types of interfaces (e.g., service-based (Nupf, etc.)) may be implemented to provide QoS monitoring data 350.

UPF 145-1 may distribute QoS monitoring reports (e.g., based on QOS monitoring data 350 or direct forwarding thereof) to other NFs, including PCF 130-1. PCF 130-1 may employ logic to identify if the current PDU session or default QoS flow 340 between UE 105 and AF 165 is meeting required QoS levels and whether a dedicated network slice or modification of QoS parameters for the existing QoS flows are needed to meet QoS requirements. For example, PCF 130-1 (or a common PCF 130 for both network slices 320/330) may act upon the reception of a poor QoS monitoring report 350 by creating a dedicated QoS flow 345 (e.g., with a unique 5G QoS Identifier (5QI) that can be used by UE 105 to properly implement a requested QoS level over default network slice 320. The 5QI value may define or correlate to various 5G QoS characteristics, such as a default priority level, a packet error rate, a packet delay budget, etc., as well as correlate to a resource type (e.g., guaranteed bit rate (GBR), a non-GBR, etc.). The 5QI value and corresponding 5G QoS characteristics may control QoS forwarding treatment for a QoS flow, such as scheduling weights, admission thresholds, queue management thresholds, link layer protocol configuration, etc. If default network slice 320 cannot support the required parameters for the dedicated QoS flow, network slice 330 may be instantiated to support traffic for a dedicated QoS flow 347 between access station 115 and AF 165. In this case, access station 115 and UE 105 may be directed to send traffic for the PDU session over dedicated network slice 330. Thus, PCF 130-1 may provide a closed loop mechanism for acting on a poor QoS monitoring report to create a QoS flow.

After UE 105 has established a PDU session with a dedicated QoS flow (e.g., dedicated QoS flow 345 or 347), PCF 130-2 (or a common PCF 130 for both network slices 320/330) may receive QoS monitoring data 355 which may provide data for QoS parameters for dedicated QoS flow 347 supporting the PDU session. For example, access station 115 may provide QoS measurements for latency, packet drops, or other metrics (e.g., jitter, burst packet drops, throughput, etc.). Additionally, or alternatively, QoS monitoring data 350 may include network congestion level data for dedicated QoS flow 345 on default slice 320. PCF 130-2 (or a common PCF 130 for both network slices 320/330) may act upon the reception of a good QoS monitoring data 350/355 (e.g., indicating that QoS exceeds the required service levels) by terminating the dedicated 5QI for dedicated QoS flow 345 or 347. Terminating the dedicated 5QI value for dedicated QoS flow 345 or 347 will cause access station 115 and UE 105 to direct traffic for the PDU session with AF 165 over default QoS flow 340 on network slice 320. Thus, PCF 130-2 may provide a closed loop mechanism for acting on a good QoS monitoring report to adaptively implement a default network slice.

According to an implementation, PCF 130 may use timers, counters, or hysteresis parameters to efficiently create/terminate a dedicated 5QI without bouncing between network slices 320 and 330. For example, PCF 130 may require multiple good QoS monitoring reports before terminating a dedicated 5QI.

Figure 4:
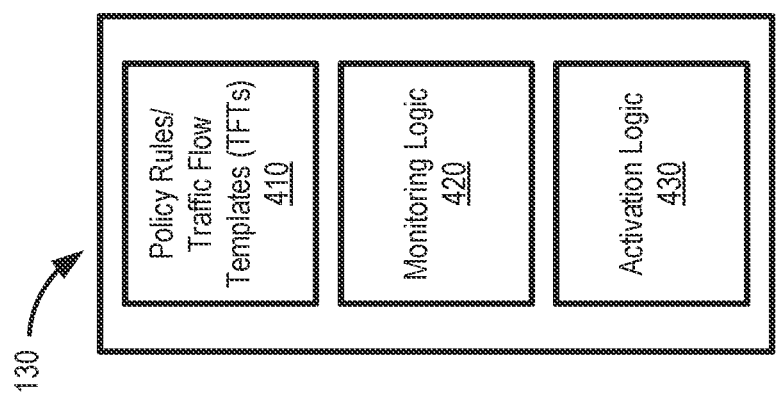
FIG. 4 is a block diagram showing logical components of a Policy Control Function (PCF) for a closed loop QoS management service.

FIG. 4 is a block diagram illustrating logical components of PCF 130 to implement the adaptive closed loop QoS management service. As shown in FIG. 4, PCF 130 may include policy rules and/or traffic flow templates (TFTs) 410, monitoring logic 420, and activation logic 430. The components of FIG. 4 may be implemented, for example, by processor 220 in conjunction with memory 230.

Policy rules/TFTs 410 may include a data structure that includes rules and TFTs that are provisioned for each application (e.g., AF 165) to support a dedicated network slice (e.g., dedicated network slice 330) for a required service level. Each set of policy rules/TFTs may be inactive when there is no congestion in default slice 320.

Monitoring logic 420 may be configured to receive QoS monitoring data 350/355 and determine whether to (a) act upon the reception of poor QoS monitoring report to create a dedicated 5QI or (b) act upon the reception of good QoS monitoring report to terminate/modify a dedicated 5QI. According to an implementation, monitoring logic 420 may compare monitoring report results to one or more stored thresholds (e.g., KPIs) for QoS. According to another implementation, access station 115 may provide QoS monitoring data that includes an indication of congestion (good, poor, etc.). In one implementation, monitoring logic 420 may store and apply different criteria for determining whether different types of QoS flows are supporting a required service level for a PDU session. For example, monitoring logic 420 may apply a conservative approach for particular application types or congestion levels, where monitoring logic 420 would identify persistent congestion on a default flow before initiating a switch to a dedicated QoS flow. As another example, monitoring logic 420 may apply an aggressive approach for other application types or congestion levels, where monitoring logic 420 would immediately initiate a switch from a default flow to a dedicated QoS flow if a certainly level of congestion is detected or if the application is of a certain type.

To prevent excessive changes, monitoring logic 420 may apply timers, counters, or hysteresis parameters such that multiple successive good/poor results must be received before terminating or activating a dedicated QoS flow. Particularly, monitoring logic may apply more aggressive logic for initiating a dedicated QoS flow, and more conservative logic for terminating the dedicated QoS flow. For example, in one implementation, PCF 130 may aggressively initiate a dedicated QoS flow upon a poor report of QoS monitoring data 350, but require several consecutive good reports of QoS monitoring data 355 before terminating a dedicated 5QI.

Activation logic 430 may create a dedicated 5QI to activate a dedicated QoS flow between UE 105 and AF 165. For example, based on a determination from monitoring logic 420, activation logic 430 may initiate a switch of a PDU session (e.g., between UE 105 and AF 165) from default QoS flow on network slice 320 to a dedicated QoS flow on network slice 320 or 330. Similarly, based on a determination from monitoring logic 420, activation logic 430 may initiate a switch of a PDU session (e.g., between UE 105 and AF 165) from a dedicated QoS flow on network slice 320 or 330 back to default QoS flow on default network slice 320.

Although FIG. 4 shows exemplary logical components of PCF 130, in other implementations, PCF 130 may include fewer components, different components, or additional components than depicted in FIG. 4. Additionally or alternatively, one or more components of PCF 130 may be included in another of NF. For example, policy rules/TFTs 410 may be stored by a UDM and jointly accessed by different PCF instances.

Figure 5A:
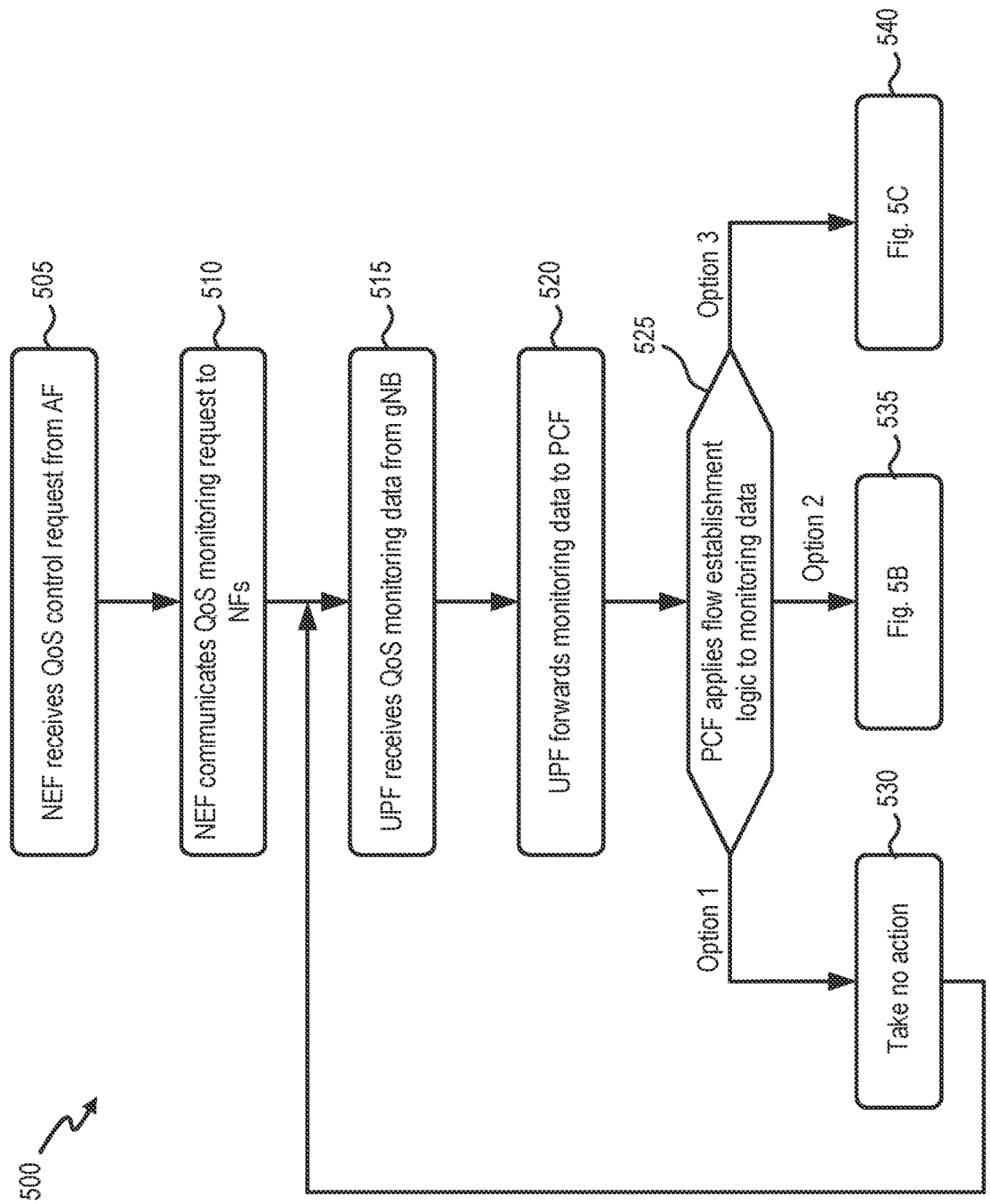

FIGS. 5A-5C are flow diagrams illustrating an exemplary process 500 for upgrading to a dedicated QoS flow in a closed loop QoS management service. In one implementation, process 500 may be performed by components of core network 120, such as PCF 130, NEF 135, and UPF 45. In another implementation, process 500 may be implemented by core network 120 and one or more other devices in network environment 100, such as access station 115.

Referring to FIG. 5A, process 500 may include receiving a QoS control request from an AF (block 505) and communicating a QoS monitoring request to NFs (block 510). For example, AF 165 may provide a QoS control request to NEF 135 to request QoS control for a PDU session with UE 105. In response, NEF 135 may communicate a QoS monitoring request to other NFs, such as access station 115 (e.g., a gNB), AMF 125, PCF 130, SMF 140, and UPF 145, to establish QoS monitoring parameters.

Process 500 may further include receiving a QoS monitoring data (block 515) and forwarding the monitoring data to a PCF (block 520). For example, access station 115 may perform QoS monitoring for the PDU session between UE 105 and AF 165. Access station 115 may provide UPF 145 with monitoring data either periodically or when threshold conditions are met. The monitoring data may include, for example, data of one or more QoS parameters for network services in a default network slice 320. UPF 145, in turn, may forward the monitoring reports to AMF 125, PCF 130, NEF 135, and/or SMF 140.

Process 500 may further include applying flow establishment logic to the monitoring updates (block 525). For example, PCF 130 may receive the monitoring updates and apply monitoring logic (e.g., monitoring logic 420) to determine if action is required to activate a dedicated QoS flow for the PDU session between UE 105 and AF 165. According to an implementation, PCF 130 may decide among three options in response to each monitoring update.

If the monitoring update indicates acceptable QoS for the PDU session over the default QoS flow on the default network slice (block 525—option 1), process 500 may include taking no action (block 530). For example, a monitoring update may indicate that QoS KPIs for the PDU session between UE 105 and AF 165 over the default QoS flow (e.g., over network slice 320) are acceptable. Alternatively, monitoring logic 420 may indicate that no closed loop actions are applicable to the particular PDU session. Thus, PCF 130 may take no action and simply continue to receive monitoring updates.

If the monitoring update indicates a first type of unacceptable QoS indication for the PDU session over the default QoS flow (block 525—option 2), process 500 may proceed to process block 535 (FIG. 5B). For example, a monitoring update may indicate that QoS KPIs for the PDU session between UE 105 and AF 165 over the default QoS flow (e.g., network slice 320) are below/above a tracking threshold. The threshold may indicate, for example, a minor level of non-compliant QoS or an approach toward a non-compliant QoS that would warrant a conservative management approach.

Referring to FIG. 5B, process block 535 may include continuing to monitor incoming QoS data for a time and/or count threshold (block 550) and determining if the logged data indicate poor performance (block 550). For example, PCF 130 receives a first monitoring report with a KPI that indicates QoS is approaching a non-compliant level, PCF 130 may log multiple incoming reports (e.g., for a certain time period or a particular number of reports). PCF 130 may then determine if the accumulation of logged reports indicates poor performance. For example, PCF 130 may look to identify a certain number of consecutive KPIs above a threshold, a KPI average above a threshold, a percentage of high/low KPIs, etc.

If the logged reports do not indicate poor performance (block 550—No), process 500 may return to block 550 and PCF 130 may continue to monitor incoming reports. If the logged reports indicate poor performance (block 550—Yes), process 500 may include creating a dedicated QoS flow (block 560) and informing the AF of the new dedicated QoS flow (block 565). For example, PCF 130 (e.g., activation logic 430) may create a dedicated 5QI to activate a dedicated QoS flow between UE 105 and AF 165. PCF 130 may inform NEF 135 of the new dedicated QoS flow, and NEF 135 may, in turn, inform AF 165.

Referring again to FIG. 5A, if the monitoring update indicates a second type of unacceptable QoS indication for the PDU session over the default network slice (block 525—option 3), process 500 may proceed to FIG. 5C. For example, a monitoring update may indicate that QoS KPIs for the PDU session between UE 105 and AF 165 over the default network slice (e.g., network slice 320) are below/above an immediate threshold, such that additional monitoring is not warranted before initiating a dedicated QoS flow. The immediate threshold may indicate, for example, a significant non-compliant QoS level (e.g., a longer-term KPI value that is below a required level, a KPI value that is more than a set amount over a required level, etc.) that would warrant an aggressive management approach.

Referring to FIG. 5C, process 500 may include creating a dedicated QoS flow (block 570) and informing the AF of the new dedicated QoS flow (block 575). For example, PCF 130

(e.g., activation logic 430) may create a dedicated 5QI to activate a dedicated QoS flow between UE 105 and AF 165. PCF 130 may inform NEF 135 of the new dedicated QoS flow, and NEF 135 may, in turn, inform AF 165.

Figure 6A:
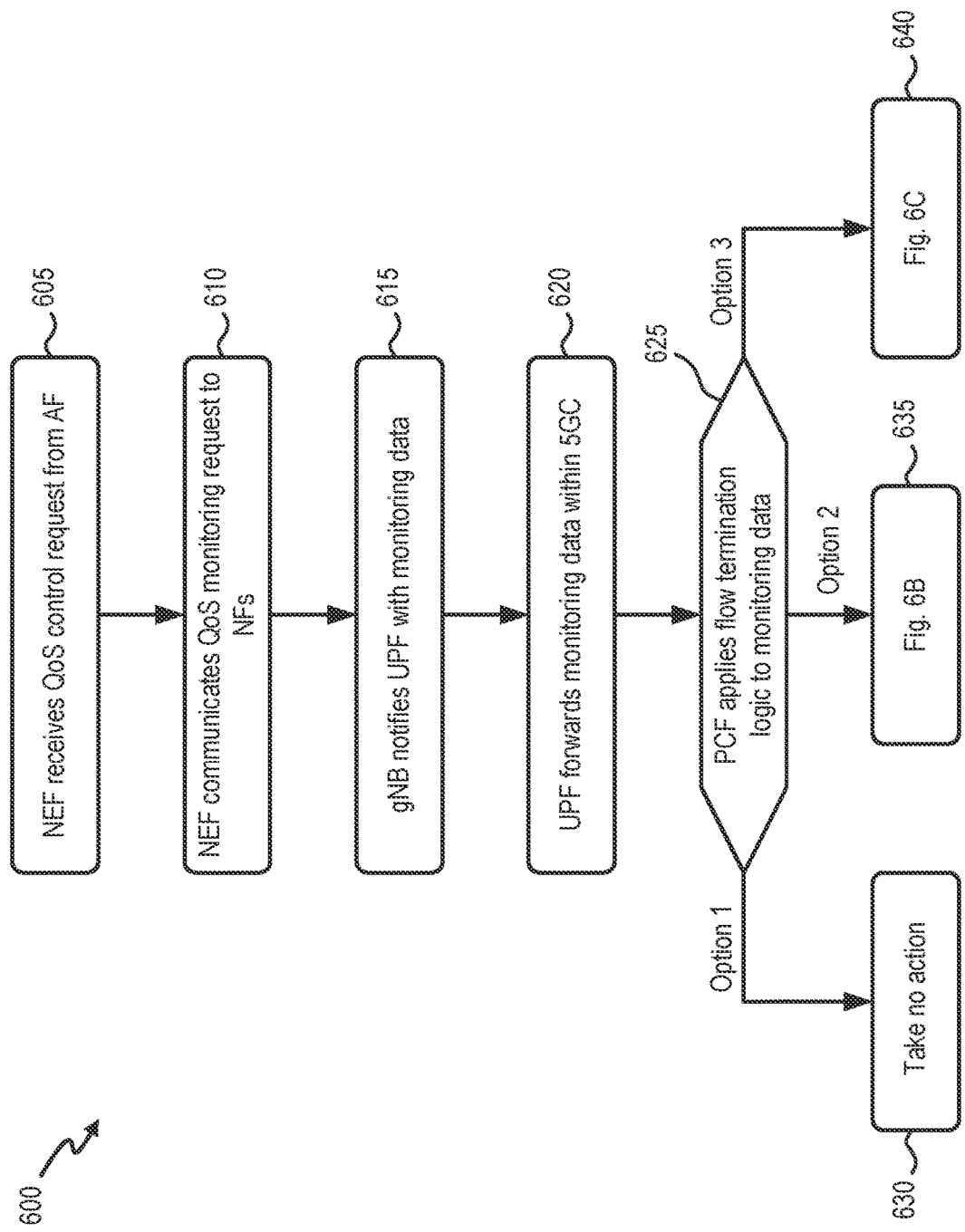

FIGS. 6A-6C are flow diagrams illustrating an exemplary process 600 for downgrading to a default QoS flow in a closed loop QoS management service. Process 600 may be used, for example, after a PDU session for UE 105 and AF 165 is established on a dedicated network slice. In one implementation, process 600 may be performed by components of core network 120, such as PCF 130, NEF 135, and UPF 45. In another implementation, process 600 may be implemented by core network 120 and one or more other devices in network environment 100, such as access station 115.

Referring to FIG. 6A, process 600 may include receiving a QoS control request from an AF (block 605) and communicating a QoS monitoring request to NFs (block 610). For example, if not previously indicated (e.g., in connection with process 500), AF 165 may provide a QoS control request to NEF 135 to request QoS control for a PDU session with UE 105. In response, NEF 135 may communicate a QoS monitoring request to other NFs, such as access station 115 (e.g., a gNB), AMF 125, PCF 130, SMF 140, and UPF 145, to establish QoS monitoring parameters.

Process 600 may further include receiving a QoS monitoring data (block 615) and forwarding the monitoring data to a PCF (block 620). For example, access station 115 may perform QoS monitoring for the PDU session between UE 105 and AF 165. Access station 115 may provide UPF 145 with monitoring reports either periodically or when threshold conditions are met. The monitoring reports may include, for example, one or more QoS parameters for network services for a dedicated QoS flow in default network slice 320 or in dedicated network slice 330. UPF 145, in turn, may forward the monitoring reports to AMF 125, PCF 130, NEF 135, and SMF 140.

Process 600 may further include applying flow termination logic to the monitoring data (block 625). For example, PCF 130 may receive the monitoring updates and apply monitoring logic (e.g., monitoring logic 420) to determine if action is required to terminate a dedicated QoS flow for the PDU session between UE 105 and AF 165. According to an implementation, PCF 130 may decide among three options in response to each monitoring update.

If the monitoring update does not indicate excellent QoS for the PDU session over the dedicated QoS flow (block 625—option 1), process 600 may include taking no action (block 630). For example, a monitoring update may indicate that QoS KPIs for the PDU session between UE 105 and AF 165 over the default network slice (e.g., network slice 320) are merely acceptable, but not above a threshold for excellent QoS. Thus, PCF 130 may take no action and simply continue to receive monitoring updates for the dedicated QoS flow.

If the monitoring update indicates a first type of excellent QoS indication for the PDU session over the dedicated QoS flow (block 625—option 2), process 600 may proceed to process block 635 (FIG. 6B). For example, a monitoring update may indicate that QoS KPIs for the PDU session between UE 105 and AF 165 over the dedicated QoS flow (e.g., over network slice 320 or 330) are below/above a tracking threshold. The threshold may indicate, for example, an excellent QoS or an approach toward an excellent QoS.

Referring to FIG. 6B, process block 635 may include continuing to monitor incoming QoS data for a time and/or count threshold (block 650), and determining if the logged data indicates excellent performance (block 650). For example, PCF 130 receives a first monitoring report with a KPI that indicates QoS is approaching excellent QoS, PCF 130 may log multiple incoming reports (e.g., for a certain time period or a particular number of reports). PCF 130 may then determine if the accumulation of logged reports indicates excellent QoS performance (e.g., the dedicated QoS flow exceeds the required service level for the PDU session). For example, PCF 130 may look to identify a certain number of consecutive KPIs above a threshold, a KPI average above a threshold, a percentage of high/low KPIs, etc.

If the logged data does not indicate excellent performance (block 650—No), process 600 may return to block 650 and PCF 130 may continue to monitor incoming data. If the logged reports indicate excellent performance (block 650—Yes), process 600 may include terminating the dedicated QoS flow (block 660) and informing the AF of the terminated QoS flow (block 665). For example, PCF 130 (e.g., activation logic 430) may provide instructions to terminate the dedicated QoS flow between UE 105 and AF 165. PCF 130 may inform NEF 135 to return to the default flow, and NEF 135 may, in turn, inform AF 165.

Referring again to FIG. 6A, if the monitoring update indicates a second type of excellent QoS indication for the PDU session over the default network slice (block 625—option 3), process 600 may proceed to FIG. 6C. For example, a monitoring update may indicate that QoS KPIs for the PDU session between UE 105 and AF 165 over the dedicated network slice (e.g., network slice 330) are below/above an immediate threshold, such that additional monitoring is not warranted before terminating a dedicated QoS flow. The immediate threshold may indicate, for example, an exceptionally high QoS level (e.g., a longer-term KPI value that is well above a required level, a KPI value that is more than a set amount over a required level, etc.).

Referring to FIG. 6C, process 600 may include terminating the dedicated QoS flow (block 670) and informing the AF of the terminated QoS flow (block 675). For example, PCF 130 (e.g., activation logic 430) may provide instructions to terminate the dedicated QoS flow between UE 105 and AF 165. PCF 130 may inform NEF 135 to return to the default flow, and NEF 135 may, in turn, inform AF 165.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 5A-6C, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a core network and from an application function (AF) in a data network, a quality of service (QoS) control request for a QoS flow supporting a protocol data unit (PDU) session, wherein the QoS control request authorizes closed loop QoS management;
   receiving, by a policy control function (PCF) device in the core network, a QoS monitoring report based on QoS monitoring by an access station, wherein the QoS monitoring report includes data for one or more parameters for network services in a default QoS flow supporting the PDU session;
   determining, by the PCF device and based on the QoS monitoring report, if the default QoS flow supports a required service level for the PDU session; and
   automatically activating, by the PCF device and based on the QoS control request, a dedicated QoS flow with a unique identifier to support the PDU session with the required service level, when it is determined that the default QoS flow does not support a required service level for the PDU session,
   wherein activating the dedicated QoS flow with the unique identifier includes creating a unique 5G QoS Identifier (5QI) for the dedicated QoS flow.

2. The method of claim 1, further comprising:
   distributing a QoS monitoring request based on the QoS control request to one or more of an Access and Mobility Management Function (AMF), the PCF device, a Session Management Function (SMF), or User Plane Function (UPF) of the core network.

3. The method of claim 1, further comprising:
   sending, by a network exposure function (NEF) device and based on the QoS control request, QoS monitoring instructions for an access station supporting the PDU session.

4. The method of claim 1, further comprising:
   storing, by the network device, policy rules for the dedicated QoS flow to support PDU sessions with the AF.

5. The method of claim 1, wherein the determining comprises:
   logging multiple QoS monitoring reports, and
   evaluating whether the multiple QoS monitoring reports indicate poor performance in the default QoS flow.

6. The method of claim 1, wherein the activating comprises:
   instantiating a dedicated network slice for the dedicated QoS flow.

7. The method of claim 1, further comprising:
   receiving, by the PCF device, a subsequent QoS monitoring report from the access station, wherein the subsequent QoS monitoring report includes one or more parameters for network services in the dedicated QoS flow;
   determining, by the PCF device and based on the subsequent QoS monitoring report, if the dedicated QoS flow exceeds the required service level for the PDU session; and
   automatically terminating, by the PCF device, the dedicated QoS flow, when it is determined that the dedicated QoS flow exceeds the required service level for the PDU session.

8. The method of claim 7, wherein determining if the dedicated QoS flow exceeds the required service level comprises:
   logging multiple subsequent QoS monitoring reports, and
   evaluating, by the PCF device, whether the multiple subsequent QoS monitoring reports indicate superior performance in the dedicated QoS flow.

9. The method of claim 8, wherein the terminating comprises:
   eliminating, by the PCF device, a dedicated 5G QoS Identifier (5QI) for the dedicated QoS flow.

10. A system comprising:
    a first network device in a core network, the first network device configured to:
       receive, from an application function (AF) in a data network, a quality of service (QoS) monitoring request for a QoS flow supporting a protocol data unit (PDU) session, wherein the QoS monitoring request authorizes closed loop QoS management; and
    a policy control function (PCF) device in the core network, the second network device configured to:
       receive a QoS monitoring report based on QoS monitoring by an access station, wherein the QoS monitoring report includes data for one or more parameters for network services in a default QoS flow supporting the PDU session;

determine, based on the QoS monitoring report, if the default QoS flow supports a required service level for the PDU session; and automatically activate, based on the QoS monitoring request, a dedicated QoS flow with a unique identifier to support the PDU session with the required service level, when it is determined that the default network slice does not support a required service level for the PDU session, wherein activating the dedicated QoS flow with the unique identifier includes creating a unique 5G QoS Identifier (5QI) for the dedicated QoS flow.

11. The system of claim 10, wherein the first network device is further configured to:

distribute the QoS monitoring request to one or more of an Access and Mobility Management Function (AMF), the PCF device, a Session Management Function (SMF), or User Plane Function (UPF) of the core network.

12. The system of claim 10, wherein the first network device is configured to:

send, based on the QoS monitoring request, QoS monitoring instructions for an access station supporting the PDU session.

13. The system of claim 10, wherein the PCF device is further configured to:

store policy rules for the dedicated QoS flow to support PDU sessions with the AF.

14. The system of claim 10, wherein, when determining if the default network slice supports a required service level, the PCF device is configured to:

log multiple QoS monitoring reports, and evaluate whether the multiple QoS monitoring reports indicate poor performance in the default QoS flow.

15. The system of claim 10, wherein, when activating the dedicated QoS flow with the unique identifier, the PCF device is configured to:

create a unique 5G QoS Identifier (5QI) for the dedicated QoS flow.

16. The system of claim 10, wherein the PCF device includes a policy control function (PCF) for the core network.

17. The system of claim 10, wherein the PCF device is further configured to:

receive a subsequent QoS monitoring report from the access station, wherein the subsequent QoS monitoring report includes one or more parameters for network services in the dedicated QoS flow;

determine, based on the subsequent QoS monitoring report, if the dedicated QoS flow exceeds the required service level for the PDU session; and automatically terminate the dedicated QoS flow, when it is determined that the dedicated QoS flow exceeds the required service level for the PDU session.

18. A non-transitory computer-readable medium containing instructions, executable by at least one processor, for:

receiving, by a core network and from an application function (AF) in a data network, a quality of service (QoS) monitoring request for a QoS flow supporting a protocol data unit (PDU) session, wherein the QoS monitoring request authorizes closed loop QoS management;

receiving, by a policy control function (PCF) device in the core network, a QoS monitoring report based on QoS monitoring by an access station, wherein the QoS monitoring report includes data for one or more parameters for network services in a default QoS flow supporting the PDU session;

determining, by the PCF device and based on the QoS monitoring report, if the default QoS flow supports a required service level for the PDU session; and automatically activating, by the PCF device and based on the QoS monitoring request, a dedicated QoS flow with a unique identifier to support the PDU session with the required service level, when it is determined that the default QoS flow does not support a required service level for the PDU session, wherein activating the dedicated QoS flow with the unique identifier includes creating a unique 5G QoS Identifier (5QI) for the dedicated QoS flow.

19. The non-transitory computer-readable medium of claim 18, further comprising instructions for:

storing, by the PCF device, policy rules for the dedicated QoS flow to support PDU sessions with the AF;

receiving, by the PCF device, a subsequent QoS monitoring report from the access station, wherein the subsequent QoS monitoring report includes one or more parameters for network services in the dedicated QoS flow;

determining, by the PCF device and based on the subsequent QoS monitoring report, if the dedicated QoS flow exceeds the required service level for the PDU session; and automatically terminating, by the PCF device, the dedicated QoS flow, when it is determined that the dedicated QoS flow exceeds the required service level for the PDU session.

20. The non-transitory computer-readable medium of claim 18, further comprising instructions for:

sending, based on the QoS monitoring request, QoS monitoring instructions for an access station supporting the PDU session.

* * * * *